United States Patent [19]

Tojo

[11] 4,280,757
[45] Jul. 28, 1981

[54] OBJECTIVE LENS SYSTEM FOR MICROSCOPES

[75] Inventor: Tsutomu Tojo, Nagano, Japan
[73] Assignee: Olympus Optical Co., Ltd., Tokyo, Japan
[21] Appl. No.: 102,347
[22] Filed: Dec. 11, 1979

[30] Foreign Application Priority Data

Dec. 13, 1978 [JP] Japan ................. 53-153036

[51] Int. Cl.$^3$ .................... G02B 9/34; G02B 21/02
[52] U.S. Cl. ................................. 350/414; 350/473
[58] Field of Search .................. 350/175 ML, 224

[56] References Cited

FOREIGN PATENT DOCUMENTS

| 46-29295 | 8/1971 | Japan | 350/175 ML |
| 117069 | 1/1959 | U.S.S.R. | 350/175 ML |

OTHER PUBLICATIONS

Foster et al., "An Achromatic Ultraviolet Microscope Objective", *Journal of Optical Soc. of America*, vol. 38, No. 8, Aug. 1948, p. 689.

*Primary Examiner*—John K. Corbin
*Assistant Examiner*—Scott J. Sugarman
*Attorney, Agent, or Firm*—Cushman, Darby & Cushman

[57] ABSTRACT

An objective lens system for microscopes comprising a front lens group consisting of a first positive cemented doublet component, a second positive single-element or cemented doublet component and a third positive single-element or cemented doublet component, and a rear lens group consisting only of a negative three-element cemented lens component, said objective lens system having a large N.A. value and being so adapted as to be usable for fluorescence microscopy by using a glass material showing, at a thickness of 10 mm, a transmittance of 80% or higher at wavelength $\lambda = 365$ nm which enhances transmittance of the entire lens system above 60%.

8 Claims, 6 Drawing Figures

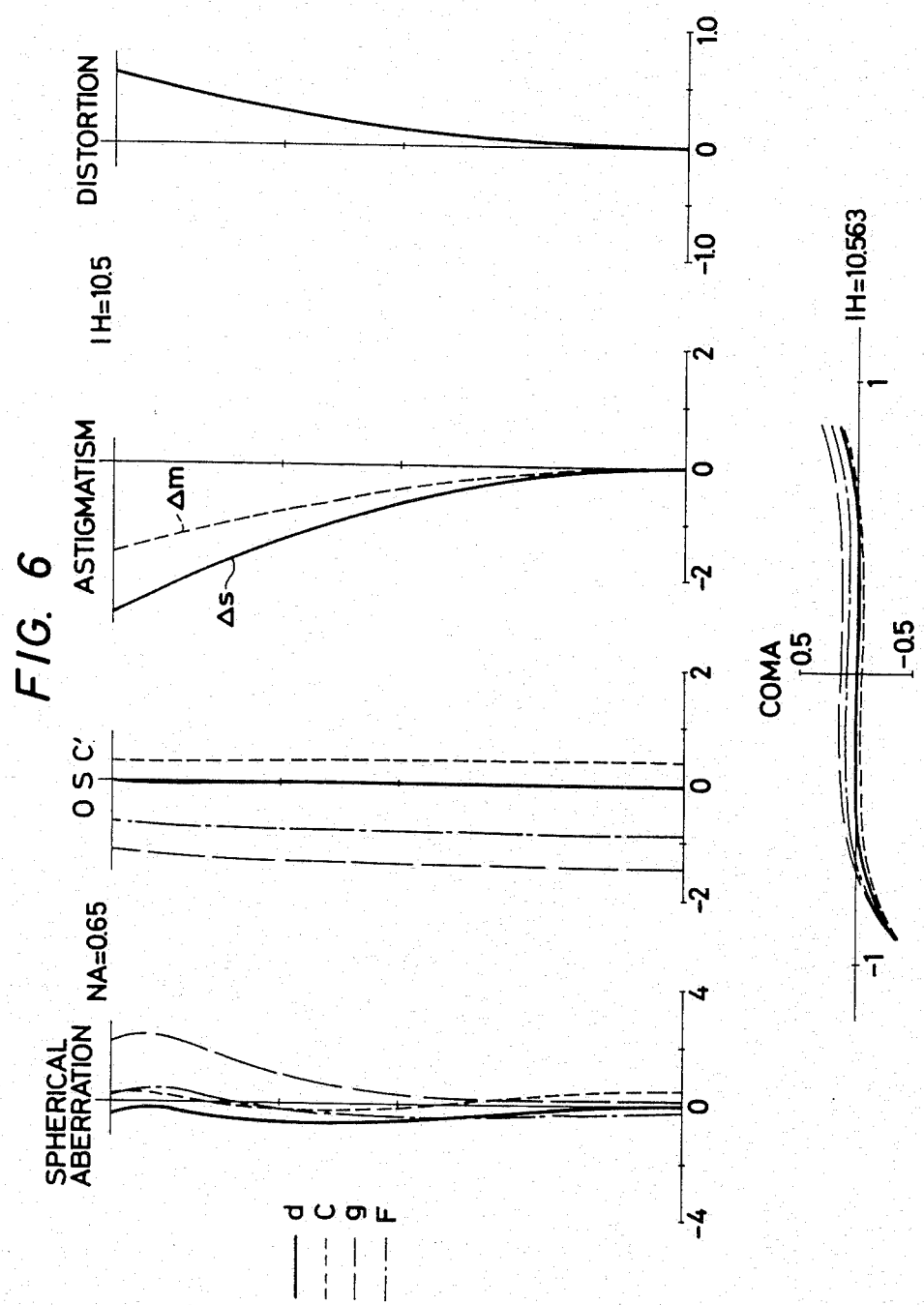

OBJECTIVE LENS SYSTEM FOR MICROSCOPES

BACKGROUND OF THE INVENTION (a) Field of the Invention

The present invention to an objective lens system for microscopes, designed for magnification level on the order of 20×, and more specifically to an objective lens system so designed as to be usable for vertical illumination fluorescence microscopy.

(b) Description of the Prior Art

Conventionally, there has been no objective lens systems designed especially for fluorescence microscopy, and ordinary type of objective lens systems for microscopes showing relatively high transmittance for excitation light (mainly ultraviolet rays) were selected for fluorescence microscopy. However, ordinary type of objective lens systems designed for magnification levels on the order of 20× have a numerical aperture (NA) value of 0.45, and even when they have relatively high transmittance, it was not high enough for fluorescence microscopy. In such objective lens systems, excitation light is attenuated rather remarkably before reaching a specimen as compared with intensity of incident light. Further, since fluorescence emitted from a specimen is very weak, objective lens systems having a small NA value remarkably darken images observed fluorescence microscopes. In order to eliminate these defects, it is required to design an objective lens system which shows high transmittance for excitation light and has a large NA at the same time. Moreover, an objective lens system having a large NA value is preferable for enhancing resolution also for purposes other than fluorescence microscopy.

SUMMARY OF THE INVENTION

A general object of the present invention is to provide an objective lens system for microscopes which has a large NA value and is so adapted as to be usable for fluorescence microcopy by using a glass material showing, at a thickness of 10 mm, transmittance of 80% or higher at wavelength $\lambda=365$ nm which can enhance transmittance of the entire lens system above 60%.

The objective lens system according to the present invention comprises a front lens group consisting of a first positive cemented doublet component, a second positive single-element lens or cemented doublet component and a third positive single-element lens or cemented coublet component, and a rear lens group consisting only of a fourth three-element cemented lens component. The objective lens system according to the present invention is so designed as to satisfy the conditions enumerated hereunder:

(1) $0.55 < r_3/r_1 < 1.04$
(2) $80 < \{(\nu_2 - \nu_1) + (\nu_p - \nu_n)\} < 130$
(3) $-0.05 < f_1/f_2 < 0$
(4) $0.1 < |(N-1)f/R| < 0.4$ wherein the reference symbols are defined as follows:

$r_1$ and $r_3$: radii of curvature on the object side and image side surfaces respectively of the first lens component R: radius of curvature on the image side surface of the single-element lens component arranged in the front lens group N: refractive index of the single-element lens component arranged in the front lens group $\nu_1$ and $\nu_2$: Abbe's numbers of both the elements respectively of the first lens component $\nu_p$ and $\nu_n$: Abbe's numbers of the positive and negative lens elements respectively of the cemented doublet arranged in addition to said first lens component in the front lens group $f_1$ and $f_2$: focal lengths of the front and rear lens groups respectively f: focal length of the objective lens system as a whole Now, significance of the afore-mentioned conditions will be described consecutively below.

The condition (1) defines refractive power of the first cemented doublet component. It is effective to correct curvature of field by correcting Petzval's sum and to correct spherical aberration as well as coma in the entire lens system. If the upper limit of the condition (1) is exceeded, curvature of field will be overcorrected and coma will be undercorrected. If the lower limit of the condition (1) is exceeded, in contrast, curvature of field will be undercorrected and coma will be overcorrected. In addition, these aberrations can be corrected more favorably when the condition (1) is combined with the condition (5) which will be described later. The condition (2) defines overall difference in dispersive power of the achromatic lenses between the front and rear lens groups. This condition (2) is effective to properly balance longitudinal chromatic aberration with lateral chromatic aberration throughout the entire lens system. If the upper limit of the condition (2) is exceeded, sufficient correction of lateral chromatic aberration will cause overcorrection of longitudinal chromatic aberration due to marginal rays having short wavelengths, thereby resulting in flare which in turn degrades image contrast. If the lower limit of the condition (2) is exceeded, sufficient correction of longitudinal chromatic aberration will cause remarkable undercorrection of lateral chromatic aberration. The condition (3) is required to correct curvature of field and coma which are likely to be produced due to weak power of the rear lens group. If $f_1/f_2$ exceeds the upper limit of the condition (3) to give positive power to the rear lens group, chromatic aberration will be overcorrected and coma will be made asymmetrical. If the lower limit of the condition (3) is exceeded to increase the negative power of the rear lens group, curvature of field will be aggravated, chromatic aberration will be remarkable and spherical aberration can difficultly be corrected. The condition (3) is also more effective when it is combined with the condition (5) described later.

The condition (4) is required to balance spherical aberration and correct sine condition. If the upper limit of the condition (4) is exceeded, asymmetrical inward coma will be aggravated and, in addition, spherical aberration will be overcorrected. If the lower limit of the condition (4) is exceeded, spherical aberration will be undercorrected and asymmetrical outward coma will be increased.

The objective lens system according to the present invention can be made more favorable when it is so designed as to satisfy, in addition to the four conditions described above, the condition (5) which is defined below:

(5) $0.4 < f/d_8 < 0.6$ wherein the reference symbol $d_8$ represents an airspace reserved between the third and fourth lens components.

The afore-mentioned condition (5) is effective to correct coma which is an offaxial asymmetrical aberration. If the upper limit of the condition (5) is exceeded, coma will be overcorrected. If $f/d_8$ is smaller than the lower limit of the condition (5), coma will be undercorrected and, in addition, the lens system may not be accommodated in an objective lens barrel.

BRIEF DESCRIPTION OF THE DRAWINGS

FIG. 3 through FIG. 6 show curves visualizing the aberration characteristics of the embodiments 1 through 4.

DESCRIPTION OF THE PREFERRED EMBODIMENTS

Figure 1:
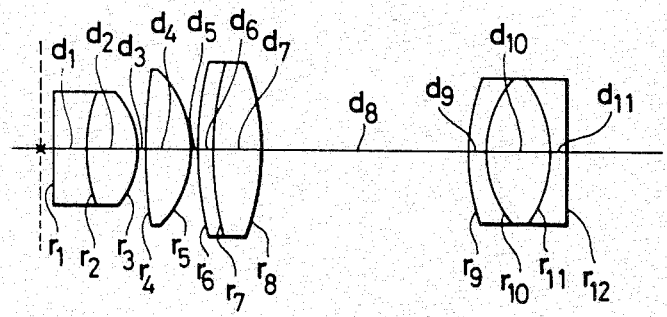
FIG. 1 shows a sectional view illustrating the composition of the lens systems preferred as embodiments 1, 2 and 4 of the present invention.

Now, numerical values of the above-described lens system will be set forth as preferred embodiments of the present invention:

Embodiment 1

$r_1 = -0.9781$
$r_2 = 1.2260$
$r_3 = -0.8122$
$r_4 = 5.4807$
$r_5 = -1.4916$
$r_6 = 3.8496$
$r_7 = 1.4447$
$r_8 = -2.1480$
$r_9 = 2.9945$
$r_{10} = 1.1828$
$r_{11} = -1.0258$
$r_{12} = -11.4926$ $d_1 = 0.3089$, $n_1 = 1.61659$, $\nu_1 = 36.63$
$d_2 = 0.6425$, $n_2 = 1.43389$, $\nu_2 = 95.15$
$d_3 = 0.0124$
$d_4 = 0.4571$, $n_3 = 1.49700$, $\nu_3 = 81.60$
$d_5 = 0.0259$
$d_6 = 0.1730$, $n_4 = 1.56883$, $\nu_4 = 56.14$
$d_7 = 0.6177$, $n_5 = 1.43389$, $\nu_5 = 95.15$
$d_8 = 2.0385$
$d_9 = 0.2076$, $n_6 = 1.50847$, $\nu_6 = 60.83$
$d_{10} = 0.6177$, $n_7 = 1.43389$, $\nu_7 = 95.15$
$d_{11} = 0.2051$, $n_8 = 1.64250$, $\nu_8 = 58.37$ $f = 1$, $NA = 0.65$, $\beta = -20X$
$f_1 = 1.11$, $f_2 = -35.27$ Embodiment 2

$r_1 = -0.9200$
$r_2 = 1.7248$
$r_3 = -0.7913$
$r_4 = -10.7611$
$r_5 = -1.3783$
$r_6 = 3.3946$
$r_7 = 2.5315$
$r_8 = -2.1188$
$r_9 = 2.3414$
$r_{10} = 1.0474$
$r_{11} = -0.9294$
$r_{12} = 10.1701$ $d_1 = 0.3116$, $n_1 = 1.64769$, $\nu_1 = 33.80$
$d_2 = 0.6484$, $n_2 = 1.43389$, $\nu_2 = 95.15$
$d_3 = 0.0125$
$d_4 = 0.4612$, $n_3 = 1.49700$, $\nu_3 = 81.60$
$d_5 = 0.0262$
$d_6 = 0.1745$, $n_4 = 1.64769$, $\nu_4 = 33.80$
$d_7 = 0.6232$, $n_5 = 1.43389$, $\nu_5 = 95.15$
$d_8 = 2.0566$
$d_9 = 0.2094$, $n_6 = 1.64250$, $\nu_6 = 58.37$
$d_{10} = 0.6232$, $n_7 = 1.43389$, $\nu_7 = 95.15$
$d_{11} = 0.2069$, $n_8 = 1.50847$, $\nu_8 = 60.83$ $f = 1$, $NA = 0.65$, $\beta = -20X$
$f_1 = 1.14$, $f_2 = -25.79$ Embodiment 3

$r_1 = -0.9636$
$r_2 = 1.8749$
$r_3 = -0.7219$
$r_4 = 3.7964$
$r_5 = 2.5147$
$r_6 = -1.7094$
$r_7 = 6.3585$
$r_8 = -3.0137$
$r_9 = 1.9644$
$r_{10} = 0.9655$
$r_{11} = -0.9838$
$r_{12} = 4.8303$ $d_1 = 0.3121$, $n_1 = 1.64769$, $\nu_1 = 33.80$
$d_2 = 0.6493$, $n_2 = 1.43389$, $\nu_2 = 95.15$
$d_3 = 0.0125$
$d_4 = 0.1748$, $n_3 = 1.64769$, $\nu_3 = 33.80$
$d_5 = 0.6243$, $n_4 = 1.43389$, $\nu_4 = 95.15$
$d_6 = 0.0262$
$d_7 = 0.4620$, $n_5 = 1.49700$, $\nu_5 = 81.60$
$d_8 = 2.0602$
$d_9 = 0.2098$, $n_6 = 1.64250$, $\nu_6 = 58.37$
$d_{10} = 0.6243$, $n_7 = 1.43389$, $\nu_7 = 95.15$
$d_{11} = 0.2073$, $n_8 = 1.49782$, $\nu_8 = 66.83$ $f = 1$, $NA = 0.65$, $\beta = -20X$
$f_1 = 1.16$, $f_2 = -31.91$ Embodiment 4

$r_1 = -1.0680$
$r_2 = 1.5381$
$r_3 = -0.7434$
$r_4 = 9.7852$
$r_5 = -1.3552$
$r_6 = 4.7414$
$r_7 = 2.7423$
$r_8 = -2.7416$
$r_9 = 2.2594$
$r_{10} = 1.0714$
$r_{11} = -0.9407$
$r_{12} = 15.0200$ $d_1 = 0.3074$, $n_1 = 1.64769$, $\nu_1 = 33.80$
$d_2 = 0.6393$, $n_2 = 1.43389$, $\nu_2 = 95.15$
$d_3 = 0.0369$
$d_4 = 0.4303$, $n_3 = 1.49700$, $\nu_3 = 81.60$
$d_5 = 0.0258$
$d_6 = 0.1721$, $n_4 = 1.64769$, $\nu_4 = 33.80$
$d_7 = 0.6147$, $n_5 = 1.43389$, $\nu_5 = 95.15$
$d_8 = 2.0285$
$d_9 = 0.1820$, $n_6 = 1.64250$, $\nu_6 = 58.37$
$d_{10} = 0.6393$, $n_7 = 1.43389$, $\nu_7 = 95.15$
$d_{11} = 0.2041$, $n_8 = 1.50378$, $\nu_8 = 66.81$ $f = 1$, $NA = 0.65$, $\beta = -20X$
$f_1 = 1.09$, $f_2 = -255.69$ wherein the reference symbols $r_1$ through $r_{12}$ represent radii of curvature on the surfaces of the respective lens elements, the reference symbols $d_1$ through $d_{11}$ designate thicknesses of the respective lens elements and airspaces reseved therebetween, the reference symbols $n_1$ through $n_8$ denote refractive indices of the respective lens elements and the reference symbols $\nu_1$ through $\nu_8$ represent Abbe's numbers of the respective lens elements.

Among the embodiments described above, the embodiments 1, 2 and 4 have such a lens composition as is illustrated in FIG. 1 in which the second lens component is a positive single-element lens whereas the third lens component is a positive cemented doublet component consisting of a negative element and a positive element. For these embodiments, the condition (2) is therefore defined as follows:

$$80 < \{(\nu_2 - \nu_1) + (\nu_5 - \nu_4)\} < 130$$

Similarly, the condition (4) for these embodiments is defined as follows:

$$0.1 < |(n_3 - 1)f/r_5| < 0.4$$

Figure 2:
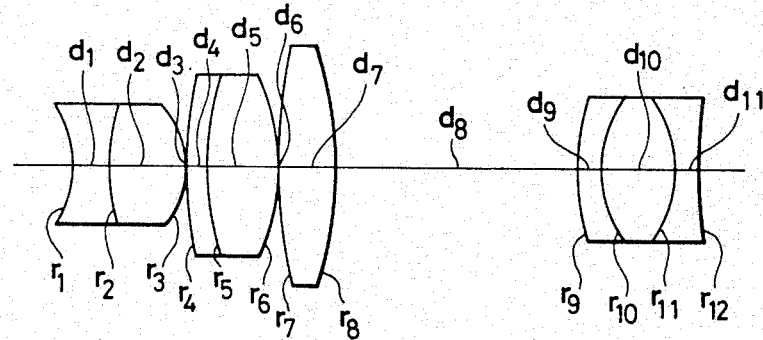
FIG. 2 shows a sectional view illustrating the composition of the lens system preferred as embodiment 3 of the present invention.
Figure 3:
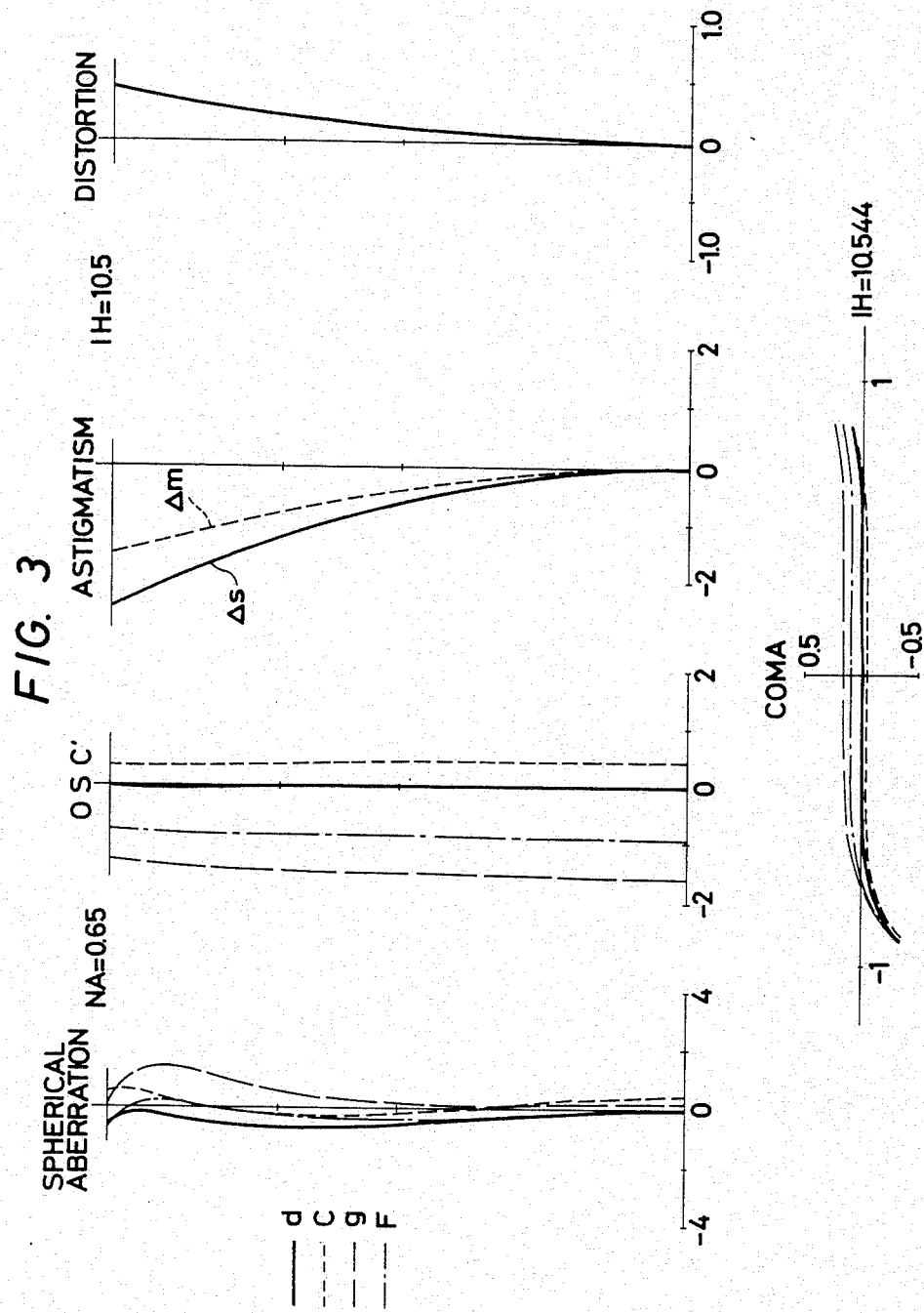
Figure 4:
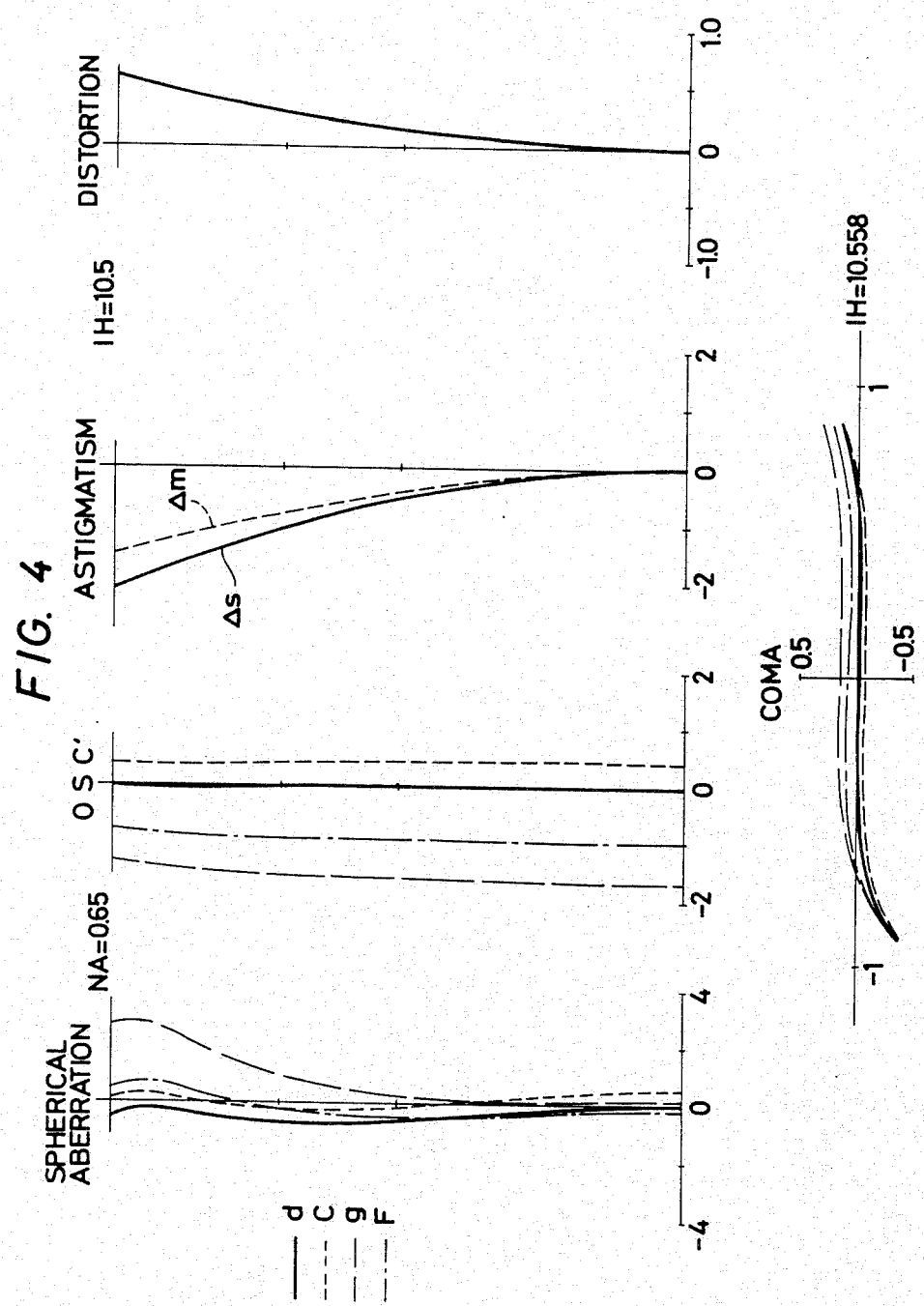
Figure 5:
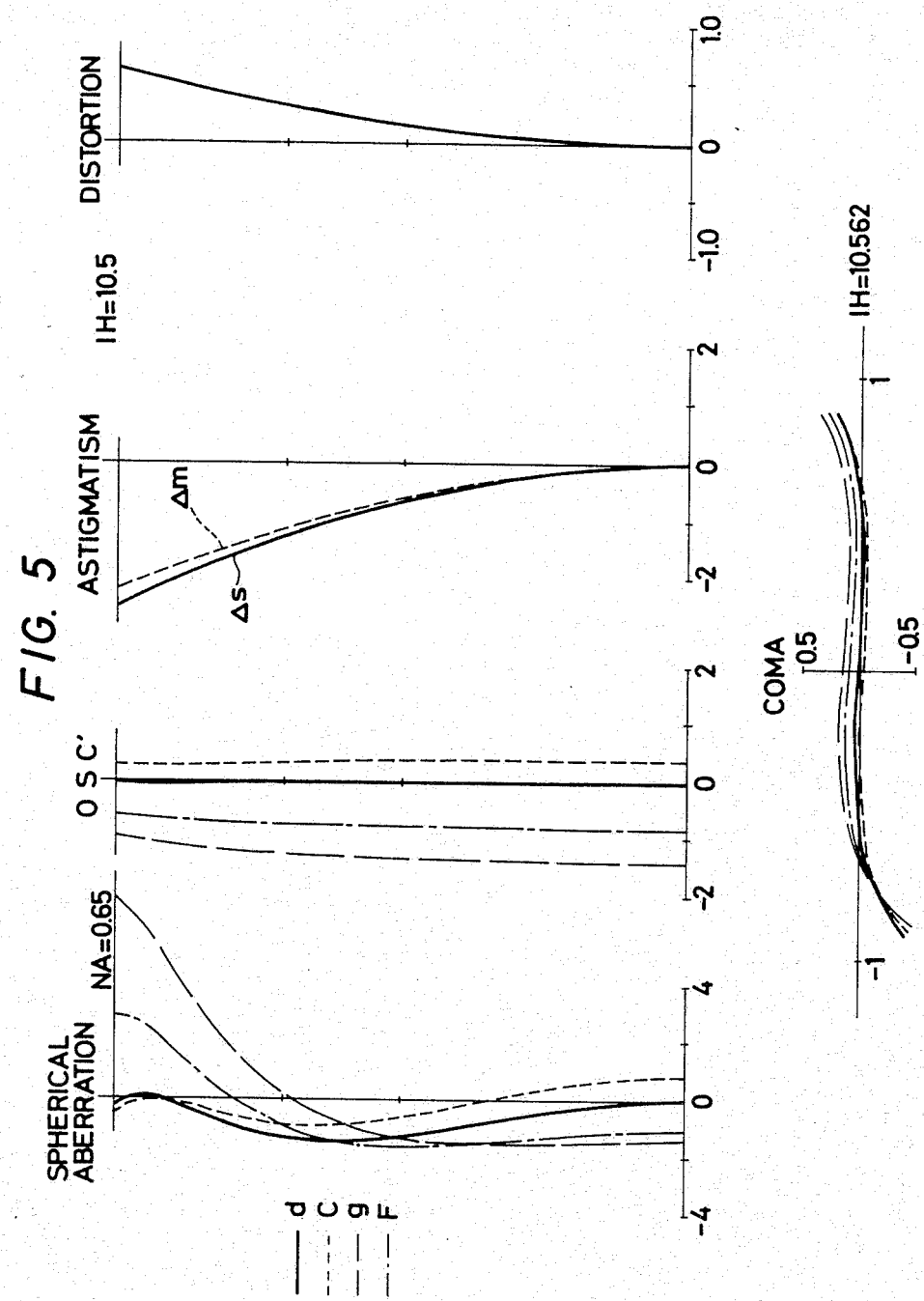

The embodiment 3 has such a lens composition as is illustrated in FIG. 2 in which the second lens component is a cemented doublet component consisting of a negative element and a positive element whereas the third lens component is a positive single-element lens. For this embodiment, the condition (2) is therefore defined as follows:

$$80 < \{(\nu_2 - \nu_1) + (\nu_4 - \nu_3)\} < 130$$

Similarly, the condition (4) for said embodiment is defined as follows:

$$0.1 < |(n_5 - 1)f/r_8| < 0.4$$

As is clear from the foregoing detailed descriptions as well as the embodiments and accompanying aberration curves, the objective lens system for microscopes according to the present invention has a large NA value and, nevertheless, assures favorably corrected aberrations even at marginal portion. Moreover, the lens system according to the present invention can be made as an objective lens system excellent for fluorescence microscopy when it uses the afore-mentioned specific glass material showing high transmittance for ultraviolet rays.

I claim:

1. An objective lens system for microscopes comprising a front lens group consisting of a first positive cemented doublet component, a second lens component having positive refractive power and a third lens component having positive refractive power, and a rear lens group consisting only of a negative three-element cemented lens component, and said lens system satisfying the following conditions:

(1) $0.55 < r_3/r_1 < 1.04$
(2) $80 < \{(\nu_2 - \nu_1) + (\nu_p - \nu_n)\} < 130$
(3) $-0.05 < f_1/f_2 < 0$
(4) $0.1 < |(N-1)f/R| < 0.4$ wherein the reference symbols $r_1$ and $r_3$ represent radii of curvature on the object side surface and image side surface respectively of the first lens component, the reference symbol R designates radius of curvature on the image side surface of the positive single-element lens component arranged in said front lens group, the reference symbol N denotes refractive index of the positive single-element lens component arranged in said front lens group, the reference symbols $\nu_1$ and $\nu_2$ represent Abbe's numbers of both the elements respectively of said first lens component, the reference symbols $\nu_p$ and $\nu_n$ designate Abbe's numbers of the positive and negative elements respectively of the cemented doublet component arranged in addition to said first lens component in said front lens group, the reference symbols $f_1$ and $f_2$ denote focal lengths of said front lens group and said rear lens group respectively, and the reference symbol f represents focal length of the objective lens system as a whole.

2. An objective lens system for microscopes according to claim 1 satisfying additionally the following condition (5):

(5) $0.4 < f/d_8 < 0.6$ wherein the reference symbol $d_8$ represents airspace reserved between said third lens component and said fourth lens component.

3. An objective lens system for microscopes according to claim 1 wherein said second lens component is a positive single-element lens and said third lens component is a positive cemented doublet consisting of a negative lens element and a positive lens element.

4. An objective lens system for microscopes according to claim 3 having the following numerical data:

| | | |
|---|---|---|
| $r_1 = -0.9781$ | | |
| $r_2 = 1.2260$ | $d_1 = 0.3089$  $n_1 = 1.61659$  $\nu_1 = 36.63$ | |
| $r_3 = -0.8122$ | $d_2 = 0.6425$  $n_2 = 1.43389$  $\nu_2 = 95.15$ | |
| $r_4 = 5.4807$ | $d_3 = 0.0124$ | |
| $r_5 = -1.4916$ | $d_4 = 0.4571$  $n_3 = 1.49700$  $\nu_3 = 81.60$ | |
| $r_6 = 3.8496$ | $d_5 = 0.0259$ | |
| $r_7 = 1.4447$ | $d_6 = 0.1730$  $n_4 = 1.56883$  $\nu_4 = 56.14$ | |
| $r_8 = -2.1480$ | $d_7 = 0.6177$  $n_5 = 1.43389$  $\nu_5 = 95.15$ | |
| $r_9 = 2.9945$ | $d_8 = 2.0385$ | |
| $r_{10} = 1.1828$ | $d_9 = 0.2076$  $n_6 = 1.50847$  $\nu_6 = 60.83$ | |
| $r_{11} = -1.0258$ | $d_{10} = 0.6177$  $n_7 = 1.43389$  $\nu_7 = 95.15$ | |
| $r_{12} = -11.4926$ | $d_{11} = 0.2051$  $n_8 = 1.64250$  $\nu_8 = 58.37$ | |
| | $f = 1$  NA $= 0.65$  $\beta = -20X$ | |
| | $f_1 = 1.11$  $f_2 = -35.27$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_8$ denote refractive indices of the respective lens elements, the reference symbols $\nu_1$ through $\nu_8$ represent Abbe's numbers of the respective lens elements, the reference symbol f designates focal length of the objective lens system as a whole, the reference symbols $f_1$ and $f_2$ denote focal lengths of said front lens group and said rear lens group respectively, the reference symbol N.A. designates numerical aperture, and the reference symbol $\beta$ represents magnification.

5. An objective lens system for microscopes according to claim 3 having the following numerical data:

| | | |
|---|---|---|
| $r_1 = -0.9200$ | | |
| $r_2 = 1.7248$ | $d_1 = 0.3116$  $n_1 = 1.64769$  $\nu_1 = 33.80$ | |
| $r_3 = -0.7913$ | $d_2 = 0.6484$  $n_2 = 1.43389$  $\nu_2 = 95.15$ | |
| $r_4 = -10.7611$ | $d_3 = 0.0125$ | |
| $r_5 = -1.3783$ | $d_4 = 0.4612$  $n_3 = 1.49700$  $\nu_3 = 81.60$ | |
| $r_6 = 3.3946$ | $d_5 = 0.0262$ | |
| $r_7 = 2.5315$ | $d_6 = 1.1745$  $n_4 = 1.64769$  $\nu_4 = 33.80$ | |

-continued

| | | | |
|---|---|---|---|
| $r_8 = -2.1188$ | $d_7 = 0.6232$ | $n_5 = 1.43389$ | $\nu_5 = 95.15$ |
| | $d_8 = 2.0566$ | | |
| $r_9 = 2.3414$ | $d_9 = 0.2094$ | $n_6 = 1.64250$ | $\nu_6 = 58.37$ |
| $r_{10} = 1.0474$ | | | |
| | $d_{10} = 0.6232$ | $n_7 = 1.43389$ | $\nu_7 = 95.15$ |
| $r_{11} = -0.9294$ | $d_{11} = 0.2069$ | $n_8 = 1.50847$ | $\nu_8 = 60.83$ |
| $r_{12} = 10.1701$ | | | |
| | $f = 1$ | $NA = 0.65$ | $\beta = -20X$ |
| | $f_1 = 1.14$ | $f_2 = -25.79$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_8$ denote refractive indices of the respective lens elements, the reference symbols $\nu_1$ through $\nu_8$ represent Abbe's numbers of the respective lens elements, the reference symbol f designates focal length of the objective lens system as a whole, the reference symbols $f_1$ and $f_2$ denote focal lengths of said front lens group and said rear lens group respectively, the reference symbol N.A. designates numerical aperture, and the reference symbol $\beta$ represents magnification.

6. An objective lens system for microscopes according to claim 3 having the following numerical data:

| | | | |
|---|---|---|---|
| $r_1 = -1.0680$ | | | |
| | $d_1 = 0.3074$ | $n_1 = 1.64769$ | $\nu_1 = 33.80$ |
| $r_2 = 1.5381$ | | | |
| | $d_2 = 0.6393$ | $n_2 = 1.43389$ | $\nu_2 = 95.15$ |
| $r_3 = -0.7434$ | | | |
| | $d_3 = 0.0369$ | | |
| $r_4 = 9.7852$ | | | |
| | $d_4 = 0.4303$ | $n_3 = 1.49700$ | $\nu_3 = 81.60$ |
| $r_5 = -1.3552$ | | | |
| | $d_5 = 0.0258$ | | |
| $r_6 = 4.7414$ | | | |
| | $d_6 = 0.1721$ | $n_4 = 1.64769$ | $\nu_4 = 33.80$ |
| $r_7 = 2.7423$ | | | |
| | $d_7 = 0.6147$ | $n_5 = 1.43389$ | $\nu_5 = 95.15$ |
| $r_8 = -2.7416$ | | | |
| | $d_8 = 2.0285$ | | |
| $r_9 = 2.2594$ | | | |
| | $d_9 = 0.1820$ | $n_6 = 1.64250$ | $\nu_6 = 58.37$ |
| $r_{10} = 1.0714$ | | | |
| | $d_{10} = 0.6393$ | $n_7 = 1.43389$ | $\nu_7 = 95.15$ |
| $r_{11} = -0.9407$ | | | |
| | $d_{11} = 0.2041$ | $n_8 = 1.50378$ | $\nu_8 = 66.81$ |
| $r_{12} = 15.0200$ | | | |
| | $f = 1$ | $NA = 0.65$ | $\beta = -20X$ |
| | $f_1 = 1.09$ | $f_2 = -255.69$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_8$ denote refractive indices of the respective lens elements, the reference symbols $\nu_1$ through $\nu_8$ represent Abbe's numbers of the respective lens elements, the reference symbol f designates focal length of the objective lens system as a whole, the reference symbols $f_1$ and $f_2$ denote focal lengths of said front lens group and said rear lens group respectively, the reference symbol N.A. designates numerical aperture, and the reference symbol $\beta$ represents magnification.

7. An objective lens system for microscopes according to claim 1 wherein said second lens component is a positive cemented doublet consisting of a negative lens element and a positive lens element, and said third lens component is a positive single-element lens.

8. An objective lens system for microscopes according to claim 7 having the following numerical data:

| | | | |
|---|---|---|---|
| $r_1 = -0.9636$ | | | |
| | $d_1 = 0.3121$ | $n_1 = 1.64769$ | $\nu_1 = 33.80$ |
| $r_2 = 1.8749$ | | | |
| | $d_2 = 0.6493$ | $n_2 = 1.43389$ | $\nu_2 = 95.15$ |
| $r_3 = -0.7219$ | | | |
| | $d_3 = 0.0125$ | | |
| $r_4 = 3.7964$ | | | |
| | $d_4 = 0.1748$ | $n_3 = 1.64769$ | $\nu_3 = 33.80$ |
| $r_5 = 2.5147$ | | | |
| | $d_5 = 0.6243$ | $n_4 = 1.43389$ | $\nu_4 = 95.15$ |
| $r_6 = -1.7094$ | | | |
| | $d_6 = 0.0262$ | | |
| $r_7 = 6.3585$ | | | |
| | $d_7 = 0.4620$ | $n_5 = 1.49700$ | $\nu_5 = 81.60$ |
| $r_8 = -3.0137$ | | | |
| | $d_8 = 2.0602$ | | |
| $r_9 = 1.9644$ | | | |
| | $d_9 = 0.2098$ | $n_6 = 1.64250$ | $\nu_6 = 58.37$ |
| $r_{10} = 0.9655$ | | | |
| | $d_{10} = 0.6243$ | $n_7 = 1.43389$ | $\nu_7 = 95.15$ |
| $r_{11} = -0.9838$ | | | |
| | $d_{11} = 0.2073$ | $n_8 = 1.49782$ | $\nu_8 = 66.83$ |
| $r_{12} = 4.8303$ | | | |
| | $f = 1$ | $NA = 0.65$ | $\beta = -20X$ |
| | $f_1 = 1.16$ | $f_2 = -31.91$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_8$ denote refractive indices of the respective lens elements, the reference symbols $\nu_1$ through $\nu_8$ represent Abbe's numbers of the respective lens elements, the reference symbol f designates focal length of the objective lens system as a whole, the reference symbols $f_1$ and $f_2$ denote focal lengths of said front lens group and said rear lens group respectively, the reference symbol N.A. designates numerical aperture, and the reference symbol $\beta$ represents magnification.

* * * * *